(12) United States Patent
Summerer (10) Patent No.: US 7,718,248 B2
(45) Date of Patent: May 18, 2010

(54) PROCESS AND APPARATUS FOR MOLDING A PLASTIC COMPONENT ONTO A PREFABRICATED PLASTIC PART

(76) Inventor: Franz Josef Summerer, Gänsbach 29, D-83253, Rimsting (DE)

( * ) Notice: Subject to any disclaimer, the term of this patent is extended or adjusted under 35 U.S.C. 154(b) by 1055 days.

(21) Appl. No.: 11/225,102

(22) Filed: Sep. 14, 2005

(65) Prior Publication Data

US 2006/0062967 A1 Mar. 23, 2006

(30) Foreign Application Priority Data

Sep. 14, 2004 (DE) .................. 10 2004 044 415

(51) Int. Cl.
- B32B 3/02 (2006.01)
- B32B 23/02 (2006.01)
- B32B 3/04 (2006.01)
- B60R 13/00 (2006.01)
- B60J 1/00 (2006.01)

(52) U.S. Cl. .................. 428/157; 428/31; 428/192; 428/121; 296/84.1

(58) Field of Classification Search .................. 428/34, 428/49, 192, 157, 31, 121; 296/84.1, 96.19
See application file for complete search history.

(56) References Cited

U.S. PATENT DOCUMENTS

| 4,874,654 | A | 10/1989 | Funaki et al. |
| 5,746,962 | A * | 5/1998 | Yamamoto .................. 264/266 |
| 5,783,287 | A | 7/1998 | Yamamoto |
| 6,811,857 | B1 | 7/2001 | Bravet et al. |
| 6,548,001 | B1 * | 4/2003 | Lichtinger .................. 264/161 |
| 2005/0238902 | A1 | 6/2005 | Bravet et al. |

FOREIGN PATENT DOCUMENTS

| DE | 38 20 232 A1 | 12/1988 |
| DE | 43 17 381 A1 | 12/1993 |
| DE | 195 31 143 C2 | 2/1997 |
| DE | 198 43 921 A1 | 3/2000 |
| WO | WO 99/44802 | 9/1999 |

* cited by examiner

*Primary Examiner*—David R Sample
*Assistant Examiner*—Catherine Simone (57) ABSTRACT

In a process for molding a plastic component onto a prefabricated plastic part, a first mold plate (1) and a second mold plate (105) are closed, a cavity in which the prefabricated plastic part (101) is located being formed between the closed mold plates (1, 105). One of the mold plates (105) is formed with a depressed zone (108) and a polymer feed (115) opening out into the depressed zone (108) for molding the plastic component onto a region of the prefabricated plastic part (101) that lies opposite the depressed zone (108). Subsequently, polymer melt is injected into the depressed zone (108) and, during the injection of polymer into the depressed zone (108), the mold plates (1, 105) are moved apart.

6 Claims, 7 Drawing Sheets

PROCESS AND APPARATUS FOR MOLDING A PLASTIC COMPONENT ONTO A PREFABRICATED PLASTIC PART

The invention relates to a process and an apparatus for molding a plastic component onto a prefabricated plastic part. The invention also relates to a multi-component molded plastic part.

For the production of single-component molded plastic parts, the injection-molding and compression processes known in plastics processing are used. Conventional injection-molding processes without an compression technique are used in particular for the production of relatively small injection-molded parts, in the case of which short flow paths occur and it is possible to work with moderate injection pressures. In the case of the conventional injection-molding process, the polymer melt is injected into a cavity formed between two closed, positionally fixed mold plates and solidifies there.

Compression processes differ from conventional injection-molding processes in that the injecting and/or solidifying operation is carried out while performing a mold plate movement. In the case of the known compression process, the mold plates have already been opened slightly before the injecting operation, in order to allow for the shrinkage occurring during the later solidification. Therefore, a pre-enlarged cavity is already present at the beginning of the injecting operation. Even with the mold plates opened slightly, the vertical flash faces of the mold ensure that the pre-enlarged cavity is still adequately sealed. The polymer melt is injected into this pre-enlarged cavity and subsequently compressed while performing a mold movement in the closing direction. In particular in the production of large-area molded parts, the (more complex) compression technique is preferred, or may even be absolutely necessary, since this is the only way of achieving a lowering of the high peak pressures required in the case of large-area molded parts. Stresses or warpage in the injection-molded parts, which occur as a result of high injection pressures, can be avoided by the compression technique. This is important in particular in the production of optical plastic products, such as glazing units (windows) in motor vehicles for example, since optical plastic products have to meet increased requirements concerning freedom from stress. Reasons for these are on the one hand that, in the case of optical parts, even relatively slight stresses are visible in the end product, and on the other hand that the presence of stresses can lead to serious problems when the window is later coated with a hard layer (for protection against scratching).

Multi-component molded plastic parts may also be produced by molding the second component onto the prefabricated first component of the molded plastic part. For this, a molding-on mold plate can be placed against the already prefabricated first component of the molded plastic part, creating a cavity for the formation of the second component between the first component of the molded plastic part and the molding-on mold plate.

Also when molding the second component onto the first component, it is important to avoid stresses or warpage and sinking in the second component, it also being possible for stresses, warpage and sinking to occur in the first component when the second component is molded on. The obvious procedure to avoid warpage and sinking also when molding on the second component is to use a conventional compression process (injecting the polymer for the second component into a pre-enlarged molding-on cavity), but is problematical, since the molding-on cavity can be subject to leakages on account of the not completely closed mold (the molding-on mold plate is drawn back from the closed position by a certain displacement at the beginning of the injecting operation to form a pre-enlarged molding-on cavity). The reason for this is that, whenever the second component does not have the same contours as the first component, sealing portions which are not formed by vertical flash faces of the mold occur, and therefore lead to leakages when the mold plates are apart.

For example, glazing units are produced in the edge region with a second plastic component running around the glazing unit in the manner of a frame—known as a black border. The surrounding black border creates a window on the first component, it not being possible for the sealing transition between the black border and the window to be sealed by a vertical flash face in the way already mentioned. The large component dimensions make production conditions intrinsically difficult.

Until now, the molding of such a black border onto a window or glazing unit has been performed with conventional injection-molding processes (without a compression technique), with the disadvantages mentioned (warpage and sinking) occurring. It must be assumed that, if a compression process is used (i.e. injecting with the mold plates open), leakages in the sealing region (transition from black border to the first component) are virtually unavoidable, even if there is great adjustment accuracy.

The invention is based on the object of providing a process and an apparatus for molding a plastic component onto a prefabricated plastic part with which high-quality multi-component molded plastic parts can be produced at low cost. In particular, sealing problems when molding on the plastic component are to be avoided. Furthermore, a high-quality multi-component molded plastic part is to be provided.

The object on which the invention is based is achieved by the features of the independent claims. Advantageous refinements and development of the invention are specified in the subclaims.

According to a first aspect of the invention, a process for molding a plastic component onto a prefabricated plastic part comprises the following steps: closing of a first mold plate and a second mold plate, a cavity in which the prefabricated plastic part is located being formed between the closed mold plates, one of the mold plates being formed with a depressed zone and a polymer feed opening out into the depressed zone for molding the plastic component onto a region of the prefabricated plastic part that lies opposite the depressed zone; with the mold plates initially closed, injection of polymer melt into the depressed zone; during the injection of polymer melt into the depressed zone, moving apart of the mold plates, the moving apart of the mold plates being controlled in such a way that a solidification of the plastic component with a sealing effect already occurs in the region of the gap forming between the mold plates.

Since the mold plates are closed at the beginning of the injecting operation for molding on the plastic component, no sealing problems occur at the beginning of the injection phase. The enlargement of the molding-on cavity (i.e. of the cavity formed between the depressed zone and the prefabricated plastic part) does not take place until the injecting operation. This allows the occurrence of leakages during the cavity enlargement to be significantly reduced. Also contributing to the increase in the sealing is the effect that the gap formation takes place at the same time as or after a commencing solidification of the polymer melt for the plastic component in the region of the gap that is forming. For this, the moving apart of the mold plates is controlled according to the invention in such a way that such an advanced solidification of the plastic component has already occurred in the region of the gap that is forming that, as a result, a "self-sealing" of the enlarging molding-on cavity can be at least partially realized.

The "subsequent" moving apart of the mold plates achieves the effect that the additional polymer melt required to compensate for shrinkage can be introduced into the molding-on cavity. This provides the possibility of being able to apply follow-up pressure without having to carry and for this purpose a classic compression process (i.e. injecting polymer melt into a pre-enlarged cavity) with the sealing problems that have been mentioned.

The process according to the invention is particularly suitable whenever the region lying opposite the depressed zone only forms a subregion of a surface of the prefabricated plastic part. In this case, a critical sealing portion (at least one) occurs between the surface of the prefabricated plastic part and the mold plate formed with the depressed zone (molding-on mold plate), at which leakages or overflows of injected material must be avoided.

Generally, to avoid leakages, the moving apart of the mold plates only begins when the molding-on cavity present between the depressed zone and the opposite region of the prefabricated plastic part is completely filled with polymer melt.

A particularly advantageous measure is distinguished by the fact that, when moving the mold plates apart, edge regions of the depressed zone remain in sealing contact with oppositely arranged sealing elements on the prefabricated plastic part. The provision of such sealing elements on the prefabricated plastic part has the effect of significantly improving the sealing of the sealing portion between the surface of the prefabricated plastic part and the molding-on mold plate. This also allows the effect to be achieved that the moving apart of the mold plates can be commenced already when the molding-on cavity present between the depressed zone and the opposite region of the prefabricated plastic part is not yet completely filled with polymer melt. This allows the filling of the molding-on cavity to be improved.

The provision of such sealing elements on the prefabricated plastic part also achieves the effect that the injected plastic component is at least partially enclosed laterally by the sealing elements. This lateral enclosure acts in an insulating manner and avoids excessively rapid cooling at the edge zones of the injected plastic component. This is advantageous because the already cooled, and consequently at least partially hardened, edge zones would otherwise be pressed by the follow-up pressure compression into the prefabricated plastic part, which would lead to optical defects on the prefabricated plastic part.

In particular, the sealing elements arranged on the prefabricated plastic part may be formed at the ends with flexible extensions in the manner of sealing lips. These are pressed particularly well against the edge regions of the depressed zone by the injected plastic.

According to a second aspect of the invention, a process for molding a plastic component onto a prefabricated plastic part which is located in a cavity formed between two mold plates, one of the mold plates being formed with a depressed zone and a polymer feed opening out into the depressed zone for molding the plastic component onto a region of the prefabricated plastic part that lies opposite the depressed zone, comprising the step of injecting polymer melt into the depressed zone. In this case, there is formed on the prefabricated plastic part, lying opposite at least one edge region of the depressed zone, a sealing element which lies in a sealing manner against the edge region of the depressed zone.

In the case of the process according to the second aspect of the invention, the sealing of the molding-on cavity (at least against that edge region that is not formed by a vertical flash face) is ensured by the sealing element on the prefabricated plastic part. Unlike in the case of the process according to the first aspect of the invention, this allows the mold plates to be spaced apart already at the beginning of the injection of polymer melt—i.e. to carry out a compression process with a pre-enlarged molding-on cavity. Developments of the process according to the second aspect of the invention have already been discussed in connection with the process according to the first aspect of the invention.

For both processes according to the invention it is the case that the moving apart of the two mold plates during the filling or injecting phase must be performed with a high level of reproducibility and accuracy with respect to the maximum degree of opening and its time sequence. The maximum degree of opening is generally predetermined by the shrinkage, i.e. if the two-component plastic part undergoes shrinkage in the thickness direction of, for example, $3/10$ mm during solidifying, the maximum degree of opening must likewise be approximately $3/10$ mm (to be more precise somewhat more, since the plastic that is added to compensate for the shrinkage likewise shrinks).

The maximum degree of opening may, however, also be more than is required to compensate for shrinkage, for example several millimeters, if there are correspondingly high sealing elements on the prefabricated plastic part. Here it must be ensured that the exactly required amount of plastic (component volume+shrinkage volume) is injected into the widened molding-on cavity.

Furthermore, the moving apart should not proceed too rapidly or abruptly. To this extent, a particularly preferred implementational variant of the process according to the invention is distinguished by the fact that, during the moving apart, the mold plates are under the effect of the force of a closing-force generating device, and the moving apart of the initially closed mold plates is achieved by subjecting the same to an opening force which is generated by an opening-force generating device and presses the mold plates away from each other.

The use of an opening-force generating device for moving the mold plates apart allows the effect to be achieved that the mold plates are opened in a specific and well-definable way during the injecting operation. This makes it possible to carry out the filling compression process, in which the mold plates move away from each other during the filling of the molding-on cavity, in a reliable manner in process terms. As a result, when filling the enlarging molding-on cavity it is also possible specifically to maintain what is known as "mold breathing", whereby pressure peaks during the filling operation are avoided.

As in every compression process, it is also the case in the process according to the invention that compression for the purpose of compensating for shrinkage is performed by moving the mold plates together. The moving together of the mold plates in the follow-up pressure phase, (i.e. after completion of the filling operation) can likewise be controlled by means of the opening-force generating device. A particularly advantageous variant of the process is distinguished to this extent by the fact that the opening force generated by the opening-force generating device is reduced again for closing the mold plates.

If no opening-force generating device is provided, the moving apart of the mold plates during the filling operation can also be performed by a reduction of the closing force exerted by the closing-force generating device.

An apparatus according to the invention for molding a plastic component onto a prefabricated molding part has a first mold plate and a second mold plate, between which there is formed a cavity in which the prefabricated plastic part is located, and one of the mold plates being formed with a depressed zone and a polymer feed opening out into the depressed zone for molding the plastic component onto a region of the plastic part that lies opposite the depressed zone. The depressed zone has edge regions, of which at least one edge region interacts in a sealing manner with an oppositely arranged sealing element on the prefabricated plastic part when the mold plates are detached from each other.

A particularly advantageous configuration of the apparatus according to the invention is distinguished by the fact that the edge region or regions of the depressed zone are formed as round or sloping surface regions. Edge regions configured as round or sloping surface regions have the effect that, when the mold plates are moved together, the sealing elements or their end extensions are bent round.

The apparatus according to the invention preferably comprises a force generating device for generating a force to which the mold plates are subjected, which is designed to make the closed mold plates move apart during the operation of filling the depressed zone with polymer melt.

If an external closing force acts on the mold plates (this is the case for example if the mold is used in an injection-molding machine), the force generating device preferably comprises an opening-force generating device for generating an opening force pressing the mold plates away from each other, which is designed to control the opening force in such a way that the closed mold plates are moved apart counter to the external closing force during the operation of filling the depressed zone with polymer melt.

As already explained, the position of the movable mold plate can be influenced by the opening-force generating device during the injecting phase ("filling compression" according to the invention) and/or the follow-up pressure phase ("follow-up compression"). Altogether, both the moving apart of the mold plates of the mold during the filling operation and the closing movement of the mold during the follow-up compression can be controlled much better than is the case without an opening-force generating device. This makes it possible for molded plastic parts of improved quality to be produced reliably in process terms.

In addition, the opening-force generating device makes it possible to carry out the compression process described above in any conventional injection-molding machine. For example, the closing force exerted by the injection-molding machine on the mold plates can remain substantially constant during the entire process. The mold movement is then controlled solely by the opening force of the opening-force generating device, counteracting the closing force, and the force brought about by the injection pressure (which is likewise directed in the opening direction).

It is pointed out that the terms "opening force" and "closing force" merely define the direction of the force acting (in the closing direction and in the opening direction, respectively). The amount of the respective forces is not determined by this designation, i.e. an opening force does not have to be adequate for opening the apparatus and a closing force does not have to be adequate for closing the apparatus.

The opening-force generating device is preferably realized by one or more cylinder-piston arrangements which are coupled mechanically and/or non-positively to the two mold plates, in particular are accommodated in one of the mold plates or in a base plate on which one of the mold plates is supported. This creates a mold with which the process described above can be carried out in any conventional injection-molding machine.

An advantageous measure is to predetermine the maximum distance between the mold plates in the moved-apart state of the mold plates by means of a stop. The opening movement of the mold plates can be performed as far as the stop, so that the latter defines the distance between the two mold plates up to the beginning of the closing movement. The stop is preferably integrated in the cylinder or the cylinder-piston arrangements and limits the maximum stroke of the piston.

A further advantageous embodiment of the apparatus according to the invention is distinguished by the fact that the mold plate formed with the depressed zone has a displaceable compression insert, which forms at least part of the bottom of the depressed zone. In this case, the apparatus according to the invention permits a double compression process for molding the plastic component onto the prefabricated molded plastic part: in an initial phase of the operation of filling the depressed zone, a "filling compression" can be carried out by the movable compression insert (by drawing back the compression inserts), without a movement of the two closed mold plates initially being required for this. This allows a filling operation that is more uniform and has fewer pressure peaks to be realized. On account of the initially positionally fixed mold plates, no leakages occur in this case at the edges of the depressed zone. The opening-force generating device then allows an opening movement of the two mold plates to be performed in the way described during the further filling of the molding-on cavity to compensate for shrinkage. In this case, the compression inserts are relieved, so that they can go into their end position (i.e. flush with the bottom of the depressed zone) without any difficulty.

The follow-up pressure, characteristic of the compression technique, to compensate for shrinkage (follow-up pressure phase) can be brought about by the bringing together of the two mold plates by reducing the opening force, the compression insert being fixed in its end position, at least in the end phase of the closing operation, in order to ensure at the end of the follow-up pressure phase that the molded-on component is subjected over its entire surface to a "surface compression" to compensate for shrinkage.

The invention is described in more detail below on the basis of exemplary embodiments with reference to the drawings, in which.

Figure 1:
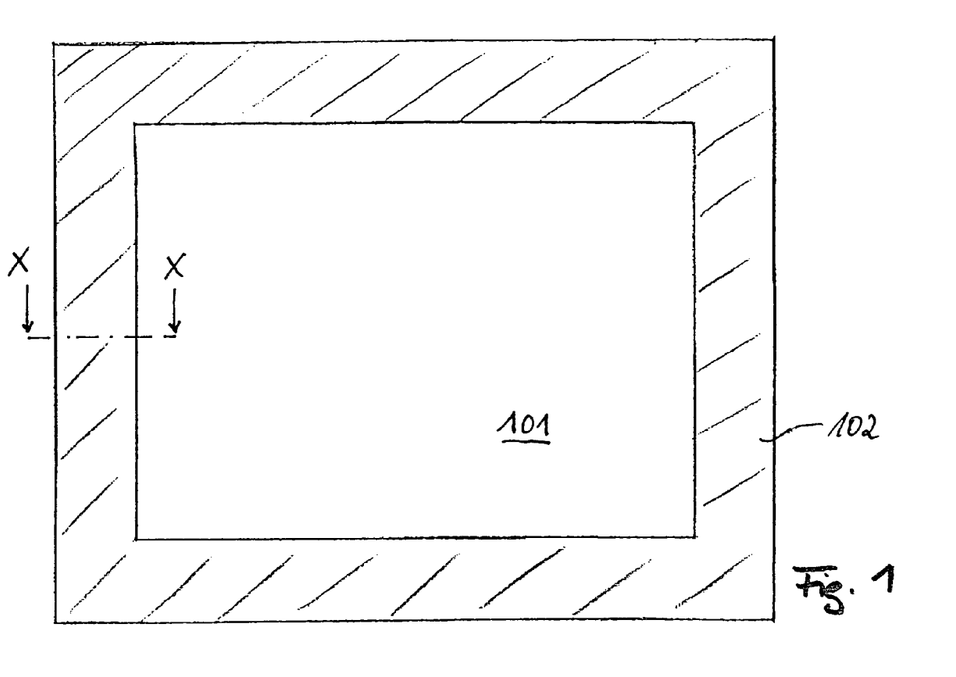
FIG. 1 shows a two-component injection-molded part in the form of a glazing unit with a black border for a motor vehicle in plan view.
Figure 2:
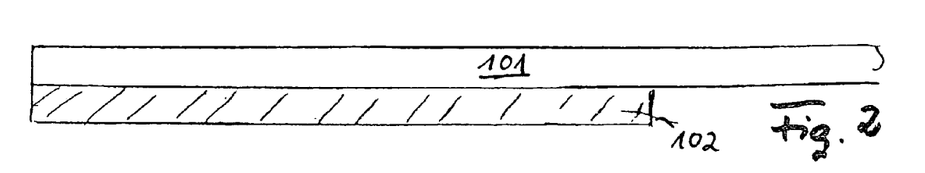
FIG. 2 shows a partial sectional view of the two-component injection-molded part represented in FIG. 1 along the sectional line X-X in FIG. 1.

FIG. 1 and FIG. 2 show by way of example a two-component injection-molded part which has been produced according to the present invention. The first component of the injection-molded part is a transparent sheet of plastic or glazing unit 101 with a substantially rectangular contour. The second component is referred to as a black border 102, which runs around the transparent glazing unit 101 in the manner of a closed frame. As can be seen in FIG. 1, the black border 102 is realized by molding a colored (optionally transparent) polymer melt onto the already produced transparent glazing unit 101.

The thickness of the transparent glazing unit 101 may be, for example, 4 mm. The side lengths of the transparent glazing unit 101 are within the usual dimensions for motor vehicle windows or sliding roofs, i.e. are generally greater by a factor of more than 50 than the thickness of the glazing unit 101. The thickness of the black border 102 may be dimensioned differently, depending on whether the black border 102 has to perform just optical functions or also mechanical functions, such as for example the formation of a stiffening frame with integrally attached fastening elements (not represented). The thickness of the black border 102 may be, for example, between 1 and 5 mm.

Figure 3:
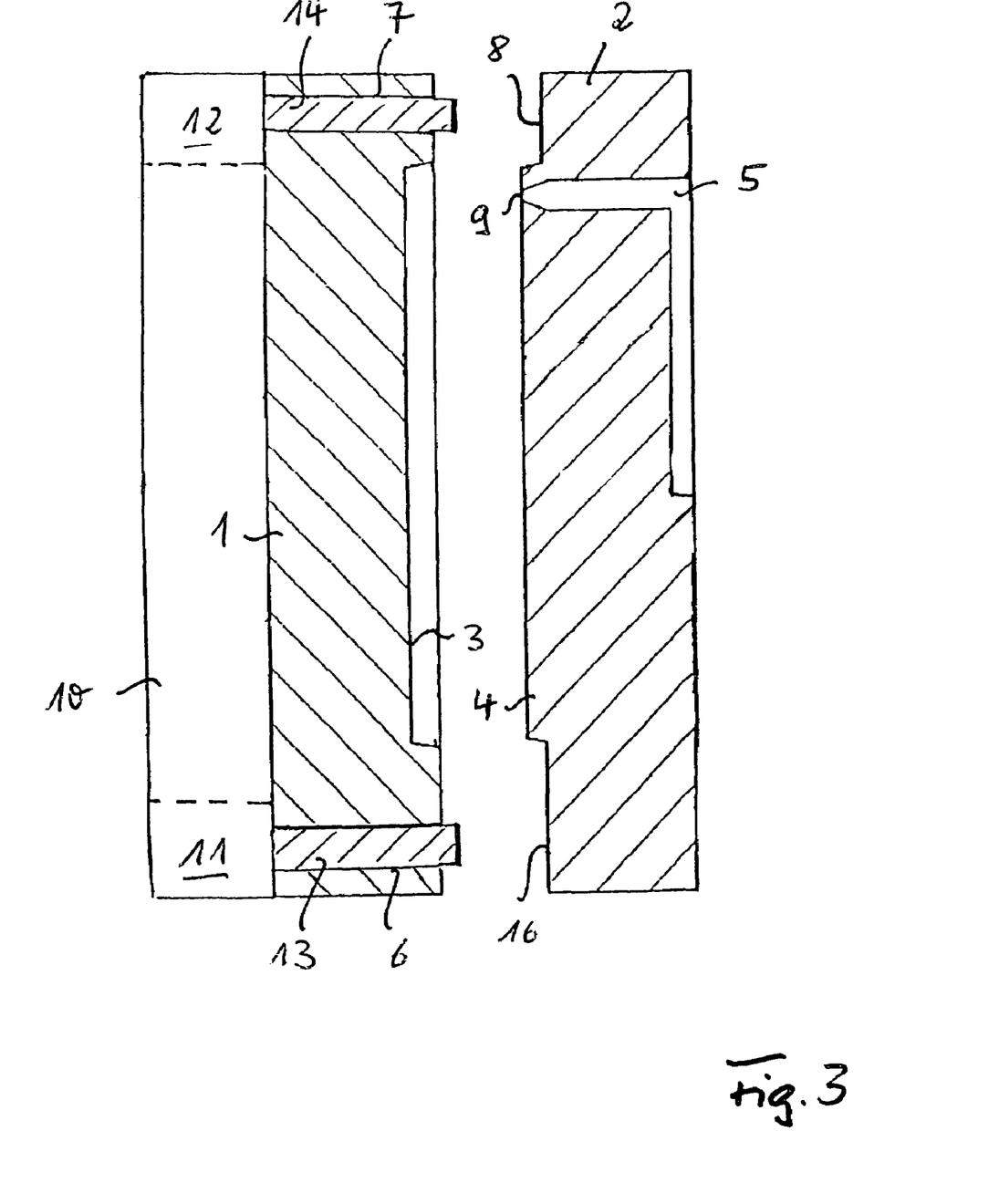
FIG. 3 shows a sectional representation of a mold for producing the prefabricated plastic part.

FIG. 3 shows in a partly sectioned representation a mold for the production of the first component 101 of the multi-component molded plastic part 101, 102. The mold has a first mold plate 1 and a second mold plate 2. The first mold plate 1 is formed as a female mold plate, i.e. it has a recess 3 on its plate side that is facing the second mold plate 2. The recess 3 has a predetermined three-dimensional shape, adapted to the article to be produced. The second mold plate 2 is formed as a mold core plate, i.e. it has at its front end what is known as a mold core 4, the outer shaping of which is adapted to the contour of the recess 3. Provided in the second mold plate 2 is a polymer feeding unit 5. The polymer feeding unit 5 is realized for example in the form of a hot runner and opens out for example into an edge region of the projecting mold core 4.

In regions laterally outside the recess 3, the first mold plate 1 has through-bores 6, 7 oriented perpendicularly in relation to the mold plate 1. The through-bore 7 represented at the top in FIG. 3 is arranged in such a way that, with the mold closed, it lies opposite a stop face 8 of the second mold plate 2, which in the exemplary embodiment represented here is alongside the outlet opening 9 of the polymer feeding unit 5. The outlet opening 9 of the polymer feeding unit 5 may, however, also be arranged elsewhere. The other through-bore 6 is located on the opposite side of the recess 3 and lies opposite a stop face 16 of the second mold plate 2. In addition, the mold comprises a base plate 10 (represented in side view), which is arranged on the rear side of the first mold plate 1 and supports the latter.

The mold is operated between the platens (not represented) of an injection-molding machine. In the fitted state, the base plate 10 is therefore located between the one platen of the injection-molding machine and the first mold plate 1. The other platen lies against the rear side of the second mold plate 2.

In the base plate 10, cylinder-piston arrangements are formed at 11 and 12. In this case, the pistons 13 and 14 of the cylinder piston arrangements 11, 12 extend through the through-bores 6 and 7, respectively, in the first mold plate 1.

It is pointed out that, instead of the second mold plate 2, the first mold plate 1 may also be equipped with the polymer feeding unit 5. Furthermore, it is possible to form the cylinder-piston arrangements 11 and 12 completely in the first mold plate 1 or in the second mold plate 2, in which case the base plate 10 can be omitted. Another solution is to form the mold plate 1 as a turning plate, which initially serves for producing the first component 101 (see FIG. 3) and then for securing the first component 101 while the second component 102 is molded on, see FIG. 4. In this case, the hydraulics 11, 12 are preferably provided neither in the first nor the second mold plate 2 but only in the molding-on mold plate 105 (see FIG. 4), since they would otherwise be required twice. The cylinder-piston arrangements 11, 12 may also be external arrangements which are coupled mechanically or non-positively to the mold plates 1, 2 or the base plate 10. All that is important is that the cylinder-piston arrangements 11, 12 must be designed to generate an opening force acting in the opening direction and relieving the mold plates 1, 2 of the closing force exerted by the injection-molding machine.

For the production of the first component (plastic glazing unit) 101, the two mold plates 1 and 2 are preferably brought into a starting position (either closed or slightly opened position of the mold plates) by moving the platens of the injection-molding machine (not represented), between which the mold 10, 1, 2 is clamped. In the starting position, the mold core 4 is inserted in the recess 3 and defines a cavity in which the first component 101 of the molded part is to be created. The production of the first component (plastic glazing unit) 101 then takes place by means of an injection-molding or (preferably) compression process.

Figure 4:
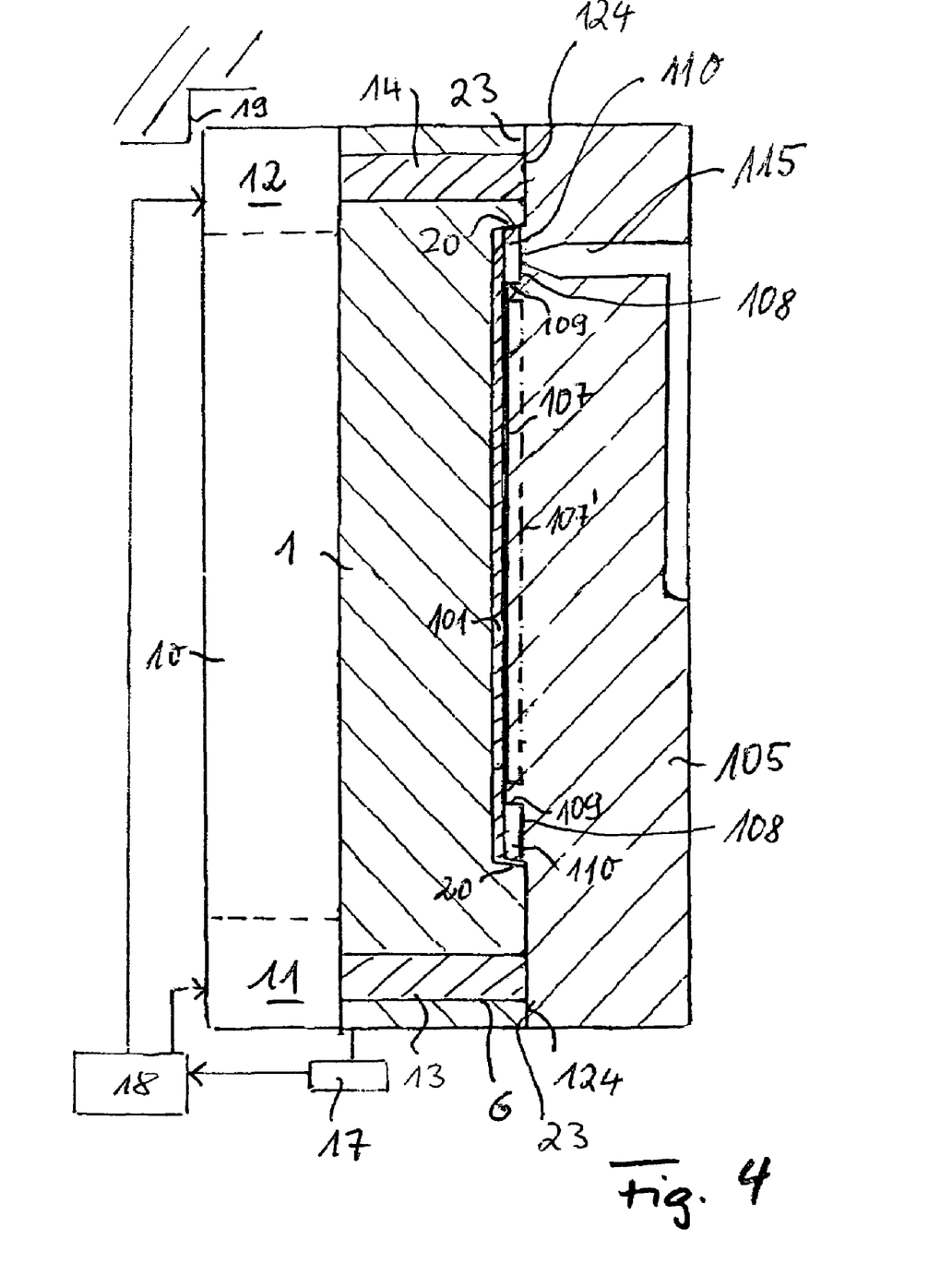
FIG. 4 shows a sectional representation of a mold for molding the plastic component onto the prefabricated plastic part.

As can be seen in FIG. 4, the already produced first component 101 is at the place where it is produced in the recess 3 of the cavity plate 1. The mold core plate 2 is then exchanged for a mold plate 105, which is also referred to hereafter as the molding-on mold plate 105. In the case of a turning-plate machine, this takes place by turning the female plate 1 by 180°, whereby it is brought into a position lying opposite the molding-on mold plate 105. The front face 107 of the molding-on mold plate 105 goes over via a step 109 into a depressed zone 108, which in the present example forms a peripheral depression frame (see also FIGS. 5, 7). The contour and the shaping of the depressed zone 108 correspond to the complementary shape of the black border 102 to be molded on (second component). Provided in the molding-on mold plate 105 is a molding-on polymer feeding unit in the form of a hot runner 115. The hot runner 115 opens out into the depressed zone 108.

For molding the second component 102 (black border) onto the first component 101 (transparent plastic glazing unit), in the case of a first variant of the process according to the first aspect of the invention, the mold plates 1, 105 are closed, stop faces 23 of the first mold plate 1 coming to lie against stop faces 124 of the molding-on molding plate 105. The closing of the mold 1, 105 may in turn take place by moving one or both platens of the injection-molding machine (not represented). With the mold 1, 105 closed, a sealed molding-on cavity 110 is formed between the surface of the first component 101 and the depressed zone 108 of the front face 107. The sealing of the molding-on cavity 110 takes place on the outside by the vertical flash face 20 (i.e. between the two mold faces) and on the inside between the step 109 of the molding-on mold plate 105 and the surface of the prefabricated plastic part 101.

The mold 1, 10, 105 is then subjected to an adequately high closing or locking force (for example 1500 t) by means of the injection-molding machine.

Subsequently, the polymer melt is injected into the depressed zone 108 via the hot runner 115. The injection is performed at relatively high pressure, in order to allow it to overcome the flow paths, which have a small cross section, i.e. to allow the polymer melt to distribute itself throughout the molding-on cavity 110 and fill it completely. During the injection of the polymer melt, melting of the first component 101 occurs near the surface in the contact region between the surface of the already solidified first component 101 and the injected hot polymer melt, so that an inseparable connection is realized between the first component 101 and the second component 102.

In the injecting operation, the injection pressure causes an injection-pressure opening force, which is opposed to the locking force. As long as the injection-pressure opening force is less than the locking force, however, there is no moving apart (opening) of the two mold plates 1, 2.

According to the invention, the two mold plates 1, 105 are moved apart during the injecting operation. Usually, the moving apart of the mold plates only takes place when the injection cavity 110 is completely filled. Preferably, the moving apart of the two mold plates 1, 105 is performed by means of the cylinder-piston arrangements 11, 12, 13, 14, which generate an opening force. This opening force is set such that the total opening force (sum of the opening force generated by the cylinder-piston arrangements 11, 12, 13, 14 and the injection-pressure opening force generated by the injection pressure) is of an amount that is somewhat higher than the locking force of the injection-molding machine. As a result, the mold opens, i.e. the movable mold plate (here for example the mold plate 1) is moved away from the stationary mold plate (here for example the mold plate 105). The opening of the mold can take place when the forces are approximately in equilibrium. With the process conducted in such a way, the position of the movable mold plates 1 can be changed even by small changes of the opening force generated by the cylinder-piston arrangements 11, 12, 13, 14 (or else pressure fluctuations of the injection-pressure opening force). The locking force of the injection-molding machine may, for example, remain constant throughout the entire compression process.

There should preferably be a specific time period between the point in time at which the molding-on cavity 110 is completely filled and the beginning of the activation of the cylinder-piston arrangements 10, 11, 12, 13, in order to ensure that a certain solidification or plastification of the polymer melt has already taken place in the region of the step 109, with the effect that no leakages, or only small leakages, can occur there when the mold plates 1, 105 move apart.

During opening of the mold 1, 105, it must be ensured that a specific maximum distance is maintained between the mold plates 1, 105. This is predetermined by the shrinkage to be expected of the multi-component plastic part 101, 102. The simplest possibility is to define the maximum distance provided in the opened state by means of a mechanical stop 19. The mechanical stop 19 may be provided at a suitable location and act with respect to the movable mold plate (here 1). However, the stop is preferably integrated in the cylinder-piston arrangements 11, 12, 13, 14 and limits the piston stroke. The opening movement is carried out by means of an open-loop control. The pressure increase in the cylinder-piston arrangements 11, 12, 13, 14 takes place—if appropriate on the basis of a predetermined curve over time—to a value previously determined by measurements.

A further possibility is to monitor the opening movement by means of a closed-loop control. In this case, the position of the movable mold plate 1 can be sensed, for example optically, by the displacement sensing device 17. The position signal is passed to a closed-loop control device 18, which compares the actual position of the movable mold plate 1 with a setpoint position. Depending on the deviation between the actual position and the setpoint position, a pressure increase or pressure decrease is performed in the cylinder-piston arrangements 11, 12, 13, 14. In this way, the movable mold plate 1 can be moved back by a predetermined opening displacement and kept in an end position. The end position may likewise be secured by a stop 19.

In both cases (open-loop or closed-loop control), the cylinder-piston arrangements 11, 12, 13, 14 can achieve the effect that the filling operation to compensate for shrinkage can be carried out under "mold breathing", whereby pressure peaks are compensated by a movement of the mold.

The phenomenon of "mold breathing" as such is already known. If the opening force occurring as result of the injection pressure is comparable to the closing force exerted by the injection-molding machine, there is an equilibrium of forces, in the case of which the position of the movable mold plate can be strongly influenced by relatively slight variations of the forces acting on it. If the filling of the cavity has not been completed at this point in time, the pressure fluctuations occurring when filling the molding-on cavity 110 are sufficient for the occurrence of slight positional changes of the movable mold plate. This is graphically referred to as "mold breathing". The mold breathing allows undesired pressure peaks during the filling of the molding-on cavity 110 to be reduced.

After the completion of the filling operation, the two mold plates 1, 105 are brought close together again in the follow-up pressure phase typical of injection-compression molding. For this purpose, the opening pressure generated by the cylinder-piston arrangements 11, 12, 13, 14 is reduced. The bringing together of the two mold plates 1, 105 may be realized in a way analogous to the moving apart of the two mold plates 1, 105 described above, either by a closed-loop control of the opening force or by an uncontrolled activation of the cylinder-piston arrangements 11, 12, 13, 14.

After completion of the compression phase, the stop faces 124 of the molding-on mold plate 105 lie on the mating stop faces 23 of the first mold plate 1 (FIG. 4). In order to ensure maximum efficiency of the machine locking, the cylinder-piston arrangements 11, 12, 13, 14 should be completely relieved after the complete closing of the mold 10, 1, 105.

The mold plate 1 may also be stationary and the mold plate 105 formed as a movable mold plate (this is the case for example with the turning plate technique explained in more detail below). In this case, the displacement sensing takes place on the mold plate 105. Similarly, a stop 19 then acts with respect to the movable mold plate 105, if the limiting does not take place by means of a preferred integrated stop in the cylinder-piston arrangements 11, 12, 13, 14.

In the case of a turning-plate machine (not represented), the mold plate 4, a turning plate and the mold plate 105 are arranged parallel to one another and in the direction normal to the closing movement of the injection-molding machine between the platens of the same. The turning plate corresponds to two plates 1 joined together at their rear sides and is mounted in such a way that it can be turned by 180°. With a turning-plate machine, a first component 101 (between the plate 4 and the turning plate 1) can be injection-molded in a first machine cycle and a second component 102 (between the turning plate 1 and the plate 105) can be injection-molded onto a first component 101 molded in the previous machine cycle. In the case of such a 3-plate arrangement, an opening-force generating device 11, 12, 13, 14 acting between the turning plate 1 and the molding-on mold plate 105 is absolutely necessary to make it possible for the plates 1, 105 to be moved apart in spite of plates 4, 1 being locked together.

Figure 5:
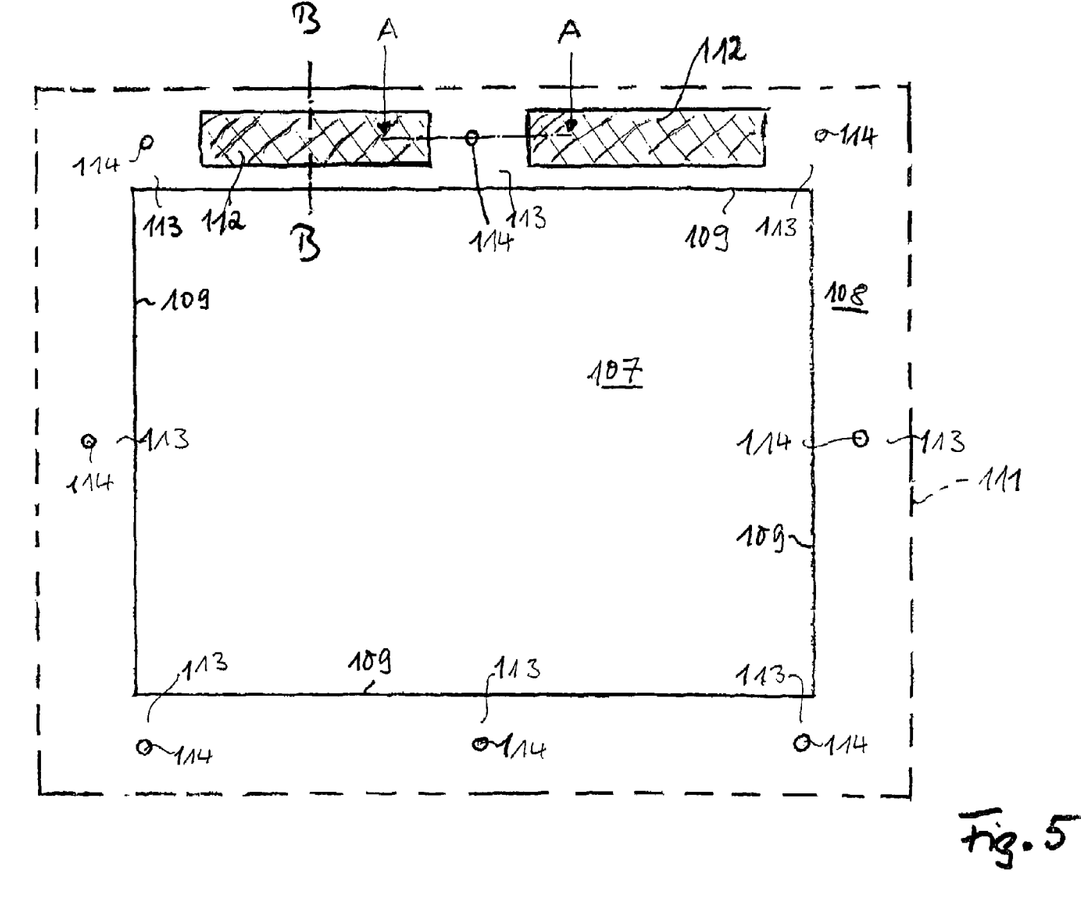
FIG. 5 shows a partial view of the mold plate for molding the plastic component onto the prefabricated plastic part in plan view.
Figure 6:
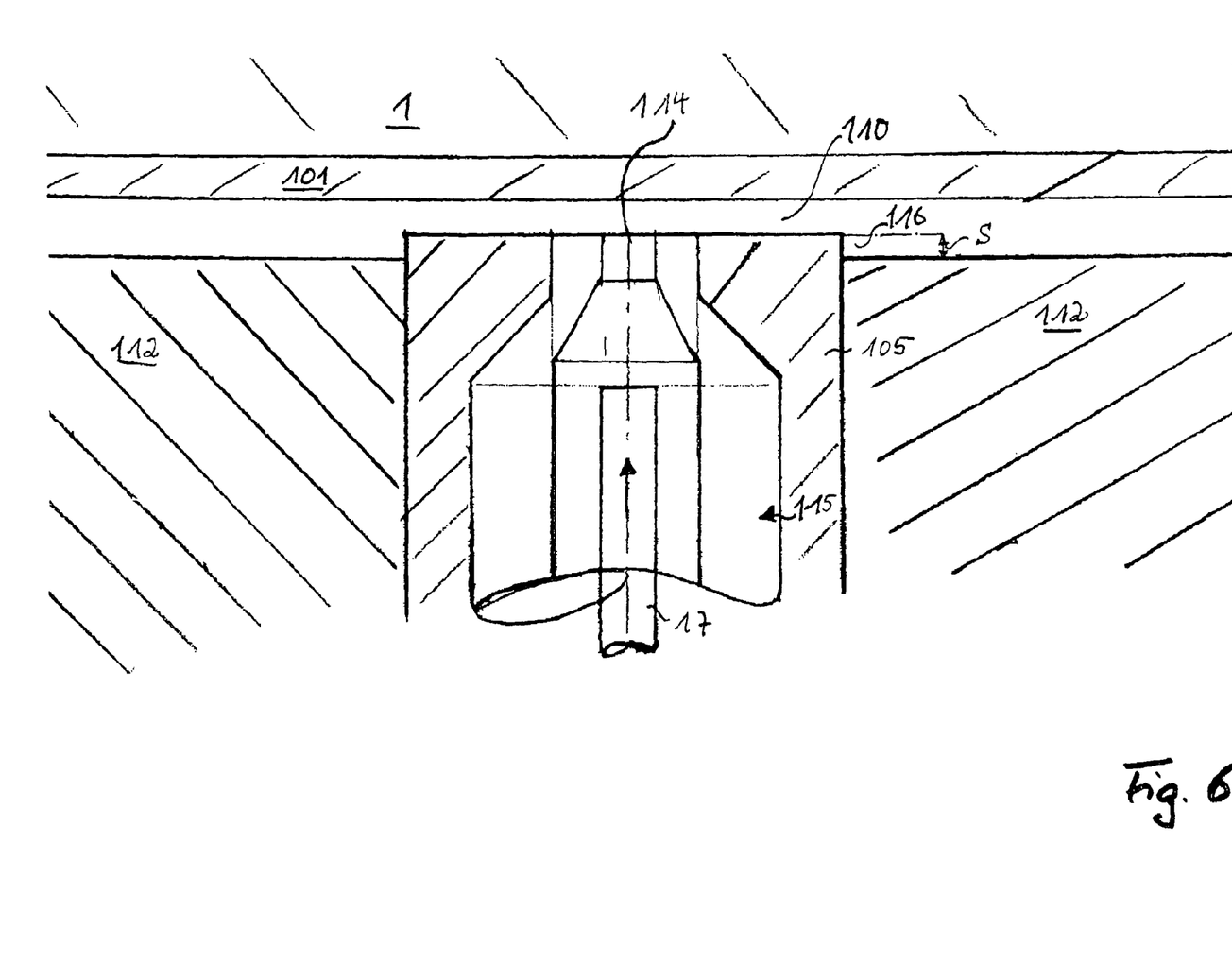
FIG. 6 shows a sectional representation along the sectional line A-A in FIG. 5.
Figure 7:
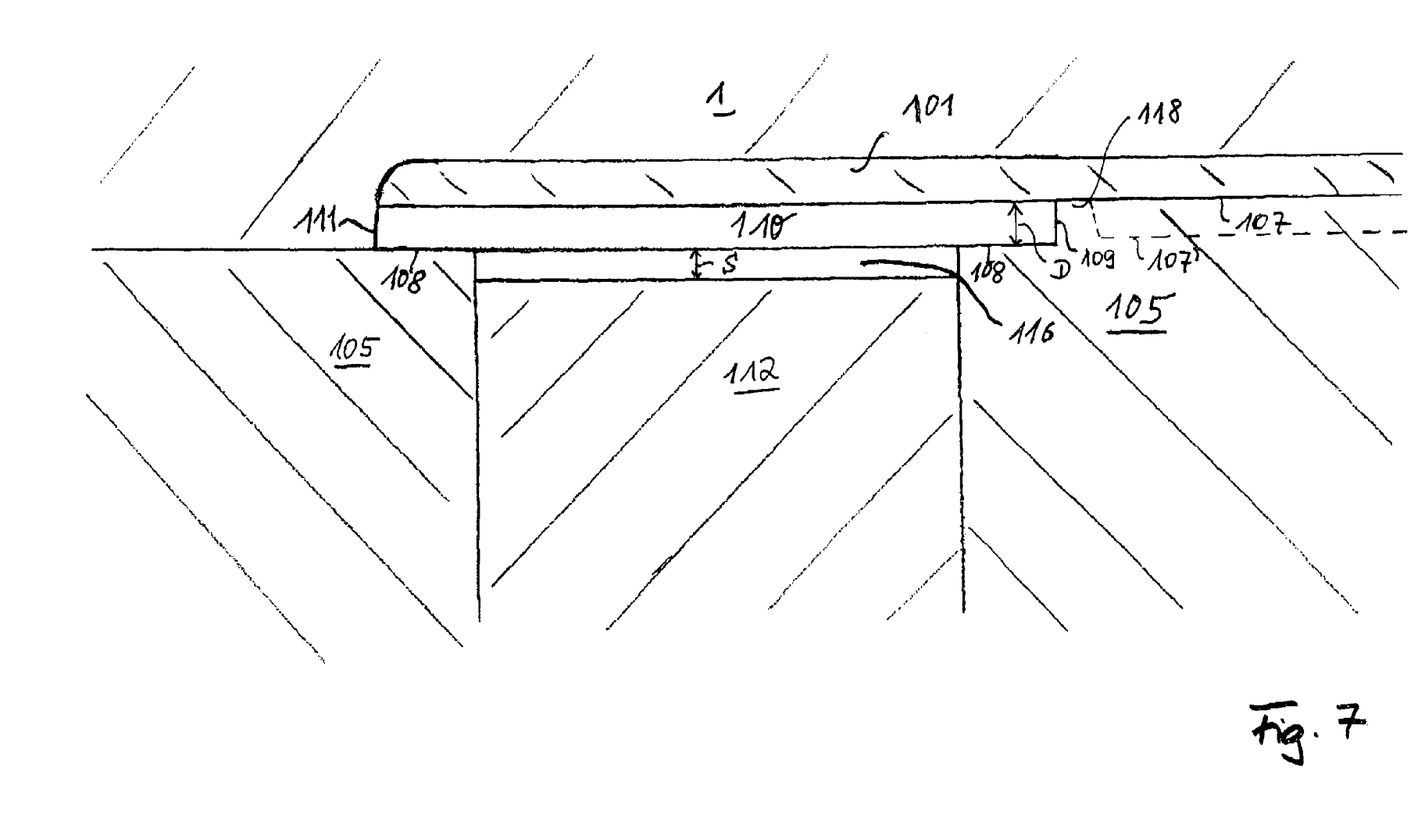
FIG. 7 shows a sectional representation along the sectional line B-B in FIG. 5.

FIG. 5 shows the molding-on mold plate 105 in plan view. Sectional representations through the sectional lines A-A and B-B are shown in FIGS. 6 and 7. The molding-on mold plate 105 has a central area 107, which protrudes above the area surrounding it, which also includes the already mentioned depressed peripheral edge zone 108. The transition between the depressed edge zone 108 and the central area 107 is formed as a step 109. The step height D may be, for example, 3 mm and corresponds to the thickness of the black border 102 to be produced. As can be seen in FIG. 7, in the closed state of the mold, the central area 107 lies against the transparent glazing unit 101 without any gap. The molding-on cavity 110 for molding on the black border 102 is formed between the edge zone 108, the step 109, the transparent glazing unit 101 and the edge 111 of the cavity for injection-molding the transparent glazing unit 101 in the first mold plate (female mold plate) 1. The step 109 and the edge 111 define the contour of the black border (component to be molded on) 102 and also the depressed edge zone 108. As already explained, the contour of the edge 111 of the molding-on cavity 110 is defined here by the vertical flash face clearance 20 of the mold. However, with a depressed zone 108 delimited by steps 109 on both sides (not represented), it is also possible to realize molding of a second component onto the prefabricated first component (glazing unit 101) that is not at the edge.

It is pointed out that it is not necessary for the entire central area 107 to lie against the first component 101. The central area 107 may be formed in a depressed manner (see line 107' in FIGS. 4 and 7), a peripheral sealing web 118, which seals the molding-on cavity 110 on the inside, being provided in this case. A corresponding sealing web for sealing the molding-on cavity 110 may also be provided on the outside if it is not sealed on the outside by the vertical flash face 20, 111.

As can be seen in FIG. 5, in the molding-on mold plate 105 there may be formed a number of compression dies 112, which in the example represented here are spaced apart from one another and, lying next to one another, extend over the entire edge zone 108 within the contour of the molded-on component 102. Only two of these compression dies 112 are represented in FIG. 5. In the spacing regions 113 between the compression dies 112 are the nozzle openings 114 for the hot runners 115 for feeding the colored polymer melt for molding the black border 102 onto the glazing unit 101. As can be seen in FIG. 6, the hot runner 115 is fixedly held in the molding-on mold plate 105. In the nozzle region, the hot runner 115 has a needle closure realized by a tension pin 117, by means of which the nozzle 114 can be opened and closed.

Instead of the needle closure shown in FIG. 6, the hot runner 115 may also be equipped with a blocking slide closure.

The compression dies 112 are mounted in the molding-on mold plate 105 displaceably in the direction of the first component 101. They may be actuated independently from one another, for example by a hydraulic system (not represented). In FIGS. 6 and 7, the compression dies 112 are represented in their drawn-back position. In this position of the compression dies 112, the molding-on cavity 110 is enlarged by a compression gap 116 in the region above the compression dies 112. The compression gap 116 increases the flow cross section for the colored polymer melt in the molding-on cavity 110 and may, for example, be of a size S (3 mm) similar to the depth (D) of the molding-on cavity 110 in the region 113 outside the compression dies 112.

If compression dies 112 are provided, the molding-on of the second component 102 is carried out in the following way:

As when molding on the second component 102 without compression dies 112, the mold 1, 105 is initially closed and is held together by means of an external closing force (for example locking force of an injection-molding machine). As represented in FIG. 7, the prefabricated, first component 101 is located in the mold 1, 105 and the compression dies 112 are initially in the lowered, i.e. drawn-back, position.

Subsequently, the generally colored polymer melt is introduced into the depressed zone 108 by opening the nozzle opening 114 of the hot runner 115. The drawn-back position of the compression dies 112 in this case makes it possible to reduce the injection pressure on account of the cross-sectional enlargement of the flow path, whereby the filling operation is facilitated. Nevertheless, on account of the long flow paths in comparison with the flow cross section, it is necessary to work with relatively high injection pressures.

During and/or after the injection of the colored polymer melt, the compression dies 112 are hydraulically pressed forward. Since the molding-on mold plate 105 in this case initially lies against the first mold plate 1 and against the glazing unit 101 in a fixed position and without any gap, no leakages occur from the molding-on cavity 110.

During the filling phase, the movement of the compression dies 112 assists the filling operation. On account of the number of injection points (nozzle openings 114), a flowing together of polymer melt takes place within the molding-on cavity 110 in the region of the center lines B-B of the compression dies 112. The resultant weld lines can be avoided or largely suppressed by conducting the process in a special way—also referred to as "segmented cascade injection molding". Suitable open-loop control of the timing of the actuation of the compression dies 112 and the discharge times of the polymer melt through the nozzle openings 114 by means of the needle closures allow the effect be achieved that the polymer melt is molded onto the glazing unit 101 in what may be graphically described as a kind of wave running around it, starting from a specific point. This can be achieved by a time-delayed actuation of adjacent compression dies 112 being performed, with a main direction of displacement being predetermined for the polymer melt. In this case, it must be ensured with regard to the control of the timing of the nozzle openings that a further nozzle 114 is only opened when it has already been flowed over by polymer melt.

Furthermore, the cylinder-piston arrangements 11, 12, 13, 14 are activated in the way already described in the case of the exemplary embodiment without compression dies 112, so that the first mold plate 1 detaches itself from the molding-on mold plate 105. The detachment of the two mold plates 1, 105 takes place after the filling phase, but may be performed later than in the case of the exemplary embodiment without compression dies 112, since the compression dies facilitate the filling operation.

The moving apart of the mold plates 1, 105 has the effect of increasing the size of the gap D, whereby the filling operation is assisted. In addition, the moving forward of the compression dies 112 is facilitated. The open-loop/closed-loop control of the movement of the mold plate 105 is performed in the same way as in the case of the exemplary embodiment without compression dies 112.

Only when the entire filling operation has been completed (i.e. after the additional polymer to compensate for shrinkage has been introduced) can the follow-up pressure be built up. Follow-up pressure can in principle be generated both by a movement of the compression dies 112 and by a closing movement of the mold 1, 105 (i.e. here of the first mold plate 1). Two possible ways of conducting the process are described below:

a) After the completion of the filling phase (the first mold plate 1 and the molding-on mold plate 105 are open in relation to each other), the compression dies 112 have already been moved completely forward, i.e. are flush with the bottom of the depressed zone 108. In this case, the follow-up pressure takes place without involvement of the compression dies 112 (i.e., with the process conducted in this way, the compression dies 112 serve merely for improving the filling operation). In the follow-up pressure phase, the first mold plate 1 is moved toward the molding-on mold plate 105, and the mold is closed, in the way already described by reducing the pressure or deactivating the cylinder-piston arrangements 11, 12, 13, 14 (see exemplary embodiment without compression dies 112).

b) After the completion of the filling phase (the first mold plate 1 and the molding-on mold plate 105 are open in relation to each other), the needle-closure nozzles are closed. The compression dies 112 are not yet flush with the bottom of the depressed zone 108. In the follow-up pressure phase, the compression dies 112 are then pressed forward over the remaining gap (for example 0.5 mm), until they are flush with the bottom of the depressed zone 108. During the follow-up pressure phase, the first mold plate 1 is moved toward the molding-on mold plate 105, and the mold is closed, in the way already described by reducing the pressure or deactivating the cylinder-piston arrangements 11, 12, 13, 14 (see exemplary embodiment without compression dies).

The (optional) "segmental compression" by means of the compression dies 112 and the "surface compression" by closing the mold 1, 105 may be performed at the same time or overlapping in time. What is important, however, is that, in the end phase of the closing operation, the compression dies 112 are fixed in their end position flush with the bottom of the depressed zone 108. This achieves the effect that, in the end phase of the compressing operation, the surface compression is carried out without the involvement of the compression dies 112. This ensures that, in the end phase of the closing operation, all the regions of the black border 102 (irrespective of whether or not they lie under a compression die 112) undergo a uniform follow-up pressure (i.e. "surface compression").

Figure 8:
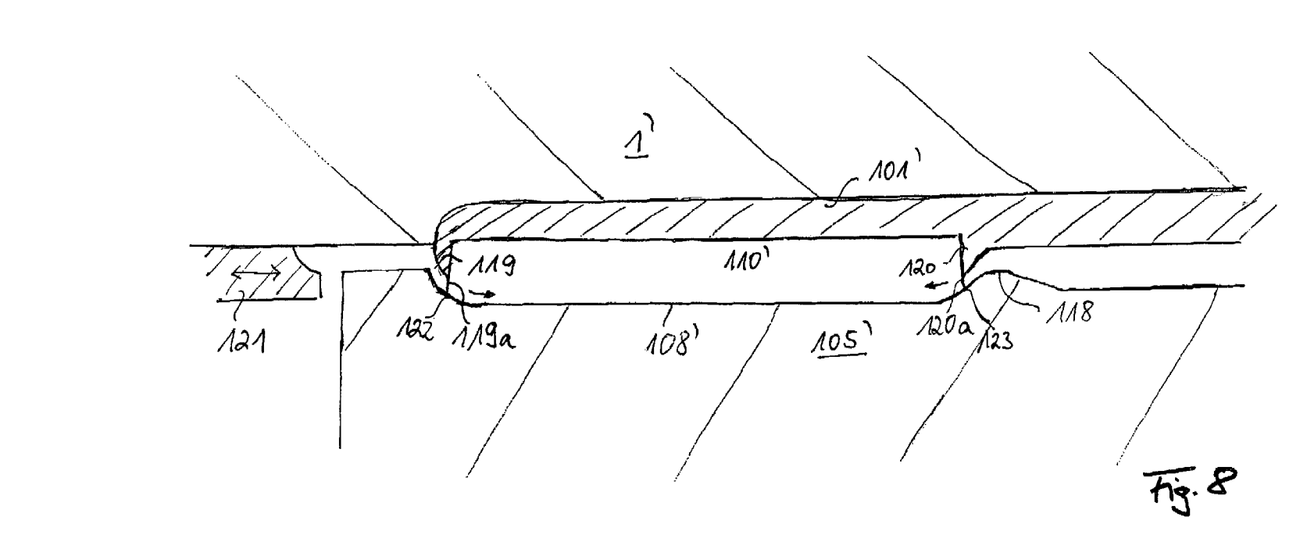
FIG. 8 shows a sectional representation corresponding to FIG. 7 with respect to an alternative configuration of the mold plate for molding the plastic compound onto the prefabricated plastic part.

FIG. 8 shows an alternative and particularly advantageous configuration of the mold plate 105 represented in FIGS. 4 to 7 for molding the component 102 onto the prefabricated plastic part 101'. The first mold plate (female plate 1') receives the already prefabricated plastic part 101'. The molding-on mold plate 105' has no compression die. In the case of this variant, the sealing of the molding-on cavity 110' during the filling operation is made possible by the prefabricated plastic part 101' being equipped with sealing projections 119, 120, which ensure that the molding-on cavity 110' is still completely sealed even when the molding-on mold plate 105' has been moved away from the first mold plate 1' by a specific moving displacement (i.e. when the mold 1', 105' has already been opened by a specific displacement). This makes the following variants of the process possible:

1. According to the first aspect of the invention, the injection of the polymer melt into the depressed zone 108' begins with the mold plates 1', 105' initially closed. As a result of the sealing projections 119, 120, the moving apart of the mold plate 1', 105' can already begin at an early point in time, i.e. at a point in time at which the molding-on cavity 110' is not yet completely filled with polymer melt.

2. The injection of the polymer melt for the second component 102 is performed in accordance with a second aspect of the invention already into a pre-enlarged molding-on cavity 110', i.e. at the beginning of the injection the mold plates 1', 105' are already spaced apart (opened), see FIG. 8. The opened position of the mold plates 1', 105' can be brought about for example by the opening-force generating device 11, 12, 13, 14, this device having to overcome the closing force exerted by the injection-molding machine. The filling of the molding-on cavity 110' is facilitated from the outset by the opened position of the mold plates 1', 105'. Therefore, a "classic" compression process is used for the molding-on of the second component 102, although the sealing of the molding-on cavity 110' is not realized by a vertical flash face clearance but by the sealing projection 20, at least on the inside (where the black border 102 adjoins the free window area). If the outer contour of the molded-on component 102 does not coincide with the outer contour of the prefabricated plastic part 101', two sealing projections 119, 120 are provided on the prefabricated plastic part 101'.

The end sealing projection 119 is realized by an integral, rounded-off continuation 119, which runs substantially perpendicularly in relation to the extent of the prefabricated plastic part 101'. The continuation 119 may have been formed by a vertical flash face slide 121, which is displaceably provided on the first mold plate 1' and is represented in FIG. 8 in the drawn-back position (in order that the molding-on mold plate 105' can be attached). In the production of such an edge continuation 119, it is possible by means of the vertical flash face slide 121 to achieve the effect that a fin 119a of the vertical flash face clearance remains as an inner extension of the continuation 119. This flexible fin 119a of the vertical flash face clearance likewise contributes in the manner of a sealing lip to the sealing of the molding-on cavity 110' during the filling operation.

Toward the inner side, the molding-on cavity 110' is realized by the tapering sealing projection 120 formed integrally on the plastic part 101'. The sealing projection 120 may likewise be realized by a flexible extension or sealing lip 120a at its end running to a point in sectional representation. This flexible extension or sealing lip 120a may likewise be created by deliberate overinjection (fin).

The end continuation 119 with the (optional) fin 119a of the vertical flash face clearance and also the sealing projection 120 with the (optional) extension 120a bring about the effect that, during the opening of the mold 1', 105' (for example by it being acted on by the opening-force generating device 11, 12, 13, 14), the molding-on cavity 110' is indeed enlarged but does not become unsealed. One reason for this is that the edge continuation 119 and the sealing projection 120 are pressed in opposite directions (i.e. apart) during the filling operation on account of the pressure building up in the molding-on cavity 110', and thereby remain in sealing contact with suitably shaped round or sloping surface regions 122, 123 of the depressed zone 108' in the molding-on of the mold plate 105'. A further reason for the seal remaining intact is that the edge continuation 119 and also the sealing projection 120 and their sealing lips 119a and 120a adapt themselves (bend round) to the suitably shaped round or sloping surface regions 122, 123 under intrinsically elastic prestress, and thereby compensate for the compression stroke (mold opening and closing) while constantly remaining in contact. The projections 119, 120 therefore realize a movement seal. The sealing faces respectively occur on the outer sides of the sealing projections 119, 120 running to a point, possibly with sealing lips 119a, 120a.

The way in which the process is conducted in the follow-up pressure phase corresponds to that which is described under a). The first mold plate 1' is moved toward the molding-on mold plate 105' and the mold 1, 105' is closed in the way already described by reducing the pressure or deactivating the cylinder-piston arrangements 11, 12, 13, 14, the sealing lips 119a, 120a being bent round inward (see arrows) by the round or sloping surfaces 122, 123.

The provision of such sealing projections 119, 120 and their sealing lips 119a and 120a on the prefabricated plastic part 101' also achieves the effect that the injected plastic component is at least partially enclosed laterally in the depressed zone 108' by the projections 119, 120 and their sealing lips 119a and 120a. This lateral enclosure, which should have a height of at least 0.5 mm, better at least 1 mm, acts in an insulating manner and avoids excessively rapid cooling at the edge zones of the injected plastic component. This prevents edge zones that have already cooled as a result of the follow-up compression, and have consequently at least partially hardened, from being pressed into the prefabricated plastic part 101', which would lead to optical defects on the prefabricated plastic part 101'.

Figure 9:
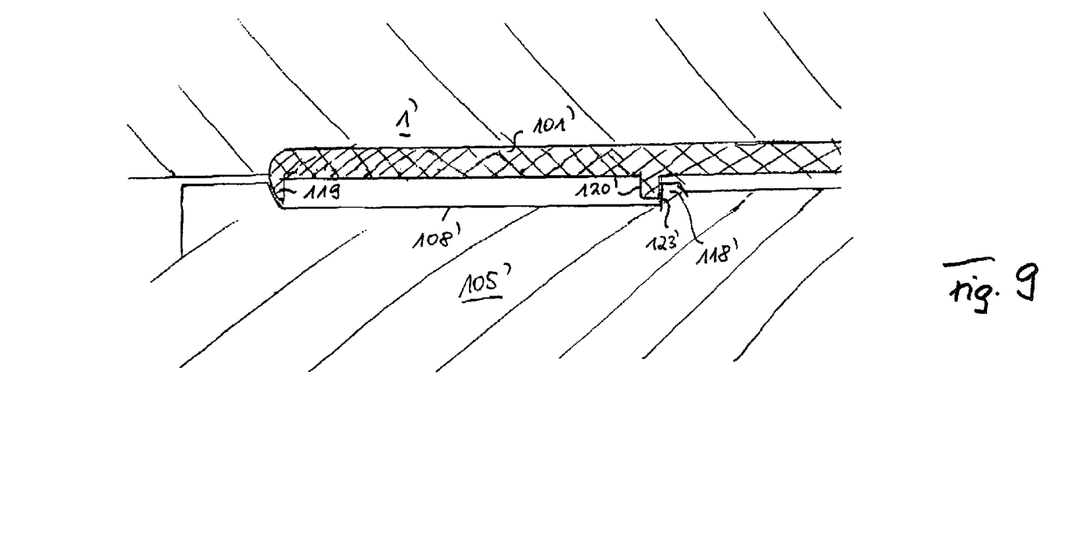
FIG. 9 shows a variant of the apparatus shown in FIG. 8.

FIG. 9 shows a variant of the representation shown in FIG. 8. Instead of the sealing projection 120, 120a Running to a point, a projection 120' with a sealing face (the outer side of the sealing projection 120') oriented substantially perpendicularly in relation to the plane of the plate (or plane of the plastic part 101') is represented. In this case, the sealing web 118' does not have any sloping or round surface regions, but a sealing face likewise oriented perpendicularly in relation to the plane of the plate. The two sealing faces are in sliding contact, whereby a movement seal is also created here. The edge projection 119 may be formed in an analogous way (not represented).

The advantage of the procedure explained on the basis of FIGS. 8 and 9 for molding the plastic component 102 to the already prefabricated plastic part 101' is that a low-cost mold is realized on account of the possible omission of the compression dies 112, even though that, both in the filling operation and in the later follow-up pressure phase, a specific enlargement or reduction of the molding-pressure cavity 110' is made possible while at the same time the molding-on cavity 110' is highly sealed.

It is pointed out that generally all the ways in which the mold can be realized and the procedures by which a plastic component 102 can be molded onto a prefabricated plastic part 101 that are explained on the basis of FIGS. 4 to 7 can also be realized with a prefabricated plastic part 101' with sealing projections 119, 120 (explained on the basis of FIGS. 8). For example, the molding-on of the plastic component 102 by means of a needle-closure nozzle according to FIG. 6 is also advantageous in the case without compression dies 112. The sealing projections 119, 120 have the effect that the implementation of the process is always more reliable in process terms and less costly. However, the sealing projection 120 (at least one) is only absolutely necessary if, at the beginning of the injection-molding, there is already a distance between the mold plates 1', 105' (to be more precise: the sealing web 118 and the surface of the prefabricated plastic part 101'), which would lead to overinjection.

The multi-component molded plastic part produced with the mold 1', 105' represented in FIGS. 8, 9 comprises the prefabricated molded part 101', from which at least one sealing projection 120, 120a protrudes. The polymer melt of the molded-on plastic component 102 is injected behind said sealing projection, which is characteristic of the molding-on process explained on the basis of FIG. 8. If sealing projections on both sides 119, 119a, 120, 120a are provided on the prefabricated plastic part 101', these two sealing projections 119, 119a, 120, 120a enclose the plastic component 102 at the edges. If, as represented in FIG. 8, sealing projections 119, 120 running to a point are provided, they are bent back toward the plastic part 101' over the plastic component 102 on account of the closing movement of the mold, i.e. form an angle of less than 90° with respect to the plastic part 101'.

The invention claimed is:

1. A multi-component molded glazing unit, comprising:
 a transparent injection-molded plastic pane;
 a sealing element integrally molded with the transparent injection-molded plastic pane; and
 a molded-on plastic component molded onto the transparent injection-molded plastic pane, the molded-on plastic component framing the transparent injection-molded plastic pane, and leaving an inner part of the transparent injection-molded plastic pane uncovered,
 wherein the sealing element behind which a polymer melt of the molded-on plastic component is injected protrudes away from the transparent injection-molded plastic pane at an edge region thereof and is bent back toward the transparent injection-molded plastic pane over the molded-on plastic component.

2. The multi-component molded glazing unit as claimed in claim 1, comprising at least two sealing elements, between which the polymer melt of a frame portion of the molded-on plastic component is located, and which protrude away from the transparent injection-molded plastic pane.

3. The multi-component molded glazing unit as claimed in claim 1, wherein the sealing element tapers in a direction towards the end.

4. A motor vehicle window, comprising:
 a transparent injection-molded plastic pane;
 a sealing element integrally molded with the transparent injection-molded plastic pane; and
 a molded-on plastic component molded onto the transparent injection-molded plastic pane, the molded-on plastic component framing the transparent injection-molded plastic pane and leaving an inner part of the transparent injection-molded plastic pane uncovered,
 wherein the sealing element behind which a polymer melt of the molded-on plastic component is injected, protrudes away from the transparent injection-molded plastic pane at an edge region thereof, and is bent back toward the transparent injection-molded plastic pane over the molded-on plastic component.

5. The motor vehicle window as recited in claim 4, comprising at least two sealing elements, between which the polymer melt of a frame portion of the molded-on plastic component is located, and which protrude away from the transparent injection-molded plastic pane.

6. The motor vehicle window as recited in claim 4, wherein the sealing element tapers in a direction towards an outside of the motor vehicle window region.

* * * * *